United States Patent [19]

Hoggett

[11] Patent Number: 4,742,436

[45] Date of Patent: May 3, 1988

[54] SPOTLIGHT IN PARTICULAR FOR A MOTOR VEHICLE AND A REFLECTOR AND AN INTERMEDIATE ASSEMBLY PART FOR SUCH A SPOTLIGHT

[75] Inventor: Patrick Hoggett, Villeneuve.Les.Sablons, France

[73] Assignee: Cibie Projecteurs, France

[21] Appl. No.: 88,464

[22] Filed: Aug. 19, 1987

Related U.S. Application Data

[63] Continuation of Ser. No. 23,915, Mar. 4, 1987, abandoned, which is a continuation of Ser. No. 825,813, Feb. 4, 1986, abandoned.

[30] Foreign Application Priority Data

Feb. 4, 1985 [FR] France ............................ 85 01502

[51] Int. Cl.⁴ .............................................. B60Q 1/02
[52] U.S. Cl. ...................................... 362/80; 362/269; 362/285; 362/296; 362/427
[58] Field of Search .................. 362/61, 80, 269, 285, 362/296, 427, 430

[56] References Cited

U.S. PATENT DOCUMENTS 4,092,528  5/1978  Puyplat .............................. 362/427
4,509,106  4/1985  Mayer et al. ........................ 362/427

FOREIGN PATENT DOCUMENTS

952602  10/1956  Fed. Rep. of Germany.

Primary Examiner—Larry I. Schwartz
Attorney, Agent, or Firm—McCormick, Paulding & Huber

[57] ABSTRACT

The reflector of the spotlight has two assembly lugs directly fitted thereto and connected to an intermediate assembly part which includes means for fixing to a support. Said intermediate assembly part and said lugs are shaped to ensure that two mutually perpendicular planes defined relative to said reflector coincide with corresponding ones of two mutually perpendicular planes defined relative to said intermediate assembly part, regardless of relative thermal expansions which may take place in the reflector and the intermediate part under normal conditions of use. Relative to the reflector said planes comprise a first plane including the optical axis and a second plane perpendicular to said first plane and parallel to the optical axis. Such an assembly reduces the effect of thermal expansion on the adjustment of the direction in which the optical axis points.

19 Claims, 3 Drawing Sheets

FIG_3

SPOTLIGHT IN PARTICULAR FOR A MOTOR VEHICLE AND A REFLECTOR AND AN INTERMEDIATE ASSEMBLY PART FOR SUCH A SPOTLIGHT

This is a continuation of co-pending application Ser. No. 023,915 filed on Mar. 4, 1987 now abandoned in turn a continuation of 825,813 filed on Feb. 4, 1986 now abandoned.

The present invention relates to a spotlight, in particular for a motor vehicle.

It relates more particularly to spotlights intended to be fixed on a support in a single localized zone, as is for example the case for "add-on" lights, i.e. commonly for lamps or extra powerful main beams which are fixed onto vehicle bumpers or to fixing plates provided for the purpose on vehicle bodywork. These examples are not restricting.

BACKGROUND OF THE INVENTION

Generally, such spotlights comprise, in addition to a reflector and a glass which together delimit a volume in which an electric light bulb is located, a shell surrounding the reflector at a distance therefrom and fixed to the reflector in the immediate vicinity of its junction with the glass, said shell being provided with a member for mounting the spotlight on a support.

The use of such a structure which is commonly found in the prior art has the advantages of providing mechanical protection for the reflector against shocks such as flying chips, and also of avoiding direct fixing between the mounting member and the reflector, since such fixing is a priori incompatible with the thermal expansions applied to the various parts of such a spotlight when put into use. Generally speaking such thermal expansions would tend to loosen the mounting member with respect to the reflector, unless the mounting member would be strongly secured thereto; in such a case, the attachment of the mounting member on the reflector would localy impede the thermal expansion of the reflector, leading to difficulties in gauging such expansion and thus compensating in advance the consequences thereof on the mean direction of the light beam of the spotlight when it is in use, and on the distribution of light within said beam.

However, the presence of a shell in prior art spotlights has the effect of confining a volume of air around the reflector, and the temperature of this volume of air rises considerably when the spotlight is in operation. As a result there is considerable thermal expansion not only of the reflector but also of the shell and this means that compensation for the effects of thermal expansion in order to avoid significantly changing the average direction in which the light beam is projected and also to avoid changing the distribution of light flux within said beam, requires complex calculations to be performed which take account both of the shell and of the reflector. The net result is an added degree of uncertainty by virtue of the presence of two separate items whose thermal behavior must be compensated for.

Further, adding a shell to a reflector increases the overall price of the spotlight.

An object of the present invention is to remedy these drawbacks by omitting the shell since its function of providing mechanical protection to the reflector can equally well be provided by reinforcing the thickness of the reflector, and also by providing means for mounting the spotlight on a support, which means are directly connected to the reflector while still allowing thermal expansion there of as required. Another object of the invention is to render said fixing means substantially insensitive to variations of temperature over the normal operating range of temperatures thereby the direction in which the light beam points and on the distribution of light flux within the beam when the spotlight is in operation, the only thermal expansions that need taking into account being those which concern the reflector.

SUMMARY OF THE INVENTION

The present invention provides a spotlight, in particular for a motor vehicle, said spotlight comprising a rigid reflector having an optical axis together with means for mounting the projector on a support, and in particular on a motor vehicle, wherein said means for mounting the spotlight comprise:

two rigid mounting lugs disposed on the out-side of said reflector symmetrically to each other about a first plane including said optical axis, each of said lugs having a first end which is directly fixed to said reflector and a second end which defines a second plane perpendicular to said first plane and parallel to said optical axis;

a rigid intermediate assembly part, said part defining a third plane and a fourth plane perpendicular to said third plane;

means for applying mutual thrust between the second end of each of said lugs and said intermediate assembly part, said means being suitable for ensuring long lasting coincidence between said first plane and said fourth plane and long lasting coincidence between said second plane and said third plane regardless of the thermal expansion to which said reflector and said intermediate assembly part may be subjected within limits corresponding to normal heating conditions when the spotlight is used at ambient temperature; and means for fixing said intermediate mounting part to said support.

In a preferred embodiment, said means for mounting the spotlight on a support comprise:

two rigid mounting lugs disposed on the outside of said reflector symmetrically to each other about a first plane including said optical axis, each of said lugs having a first end which is directly fixed to said reflector and a second end in the form of a flat flange turned towards said first plane and disposed along said second plane perpendicular to said first plane and parallel to said optical axis, the flanges of said lugs being mutually disjoint and pointing plane end edges towards each other and said first plane, said plane end edges being perpendicular to said second plane and being at the same angle $\alpha$ relative to said first plane to define between said end edges a space which converges in a given direction parallel to said optical axis, each flange having first and second plane faces adjacent to said end edges, parallel to said second plane and respectively facing towards said reflector and away from said reflector, said first and second plane faces of each flange being separated from each other by a fixed distance d, and said first faces being coplanar with each other and said second faces being coplanar with each other;

a rigid intermediate assembly part having two grooves disposed along a third plane coinciding with said second plane and being disposed symmetrically to each other on either side of a fourth plane perpendicular to said third plane and coinciding with said first plane, said grooves being open in an outward direction away from said fourth plane and being delimited towards said fourth plane by respective plane bottoms extending perpendicularly to said third plane and at said angle α to said fourth plane, said grooves being further delimited going away from said third plane by respective first and second plane faces parallel to said third plane and facing said third plane, said first and second plane faces of each groove being separated from each other by substantially said distance d, said groove first plane faces being coplanar and said second plane faces being coplanar, each flange being engaged in a respective groove in a position such that said first and second plane faces of each flange come into flat contact with said first and second plane faces of the corresponding groove and with said flange end edges coming into contact with said groove bottoms;

mutual bearing areas between said flanges and said intermediate assembly part, said bearing areas being situated respectively on said flanges perpendicularly to said first and second planes and along said second plane, between said first plane and theoretical plane extensions of said end edges and on said intermediate part perpendicularly to said third and fourth planes and along said third plane, between said fourth plane and theoretical plane extensions of said groove bottoms, to urge said flanges upsteam relative to said given direction and relative to said intermediate assembly part, thus applying said end edges of said flanges flat against said groove bottoms with a wedging effect, regardless of the thermal expansion to which said reflector and said intermediate assembly part may be subjected within limits corresponding to normal heating conditions when the spotlight is used at ambient temperature; and means for fixing said intermediate mounting part to said support.

In such a structure, the thermal expansions to which the spotlight is subjected when in service may be accompanied by sliding between the plane faces of the lug flanges relative to the plane faces of the grooves in the intermediate mounting part. This has no effect on the thermal expansion of the reflector even though the ends of the flanges are kept pressed against the bottoms of the grooves, thereby ensuring permanent coincidence between said first and fourth planes and between said second and third planes while the third and fourth planes are fixed with respect to the support. Thus, the only thermal expansion which needs to be taken into account in order to compensate for possible ill effects on the direction of the optical axis and on the distribution of light flux within the projected light beam is the thermal expansion of the reflector itself, and in particular as its temperature rises from the cold or off state to the hot or on state.

Preferably, means are provided for mutually disengaging said mutual bearing areas, thereby releasing the flanges of the lugs from the grooves and thus facilitating assembly of a reflector on an intermediate mounting part which is already fixed to its support, and also facilitating subsequent removal thereof without removing the intermediate assembly piece from the support.

Such a disposition is particularly advantageous for a spotlight in which the reflector includes a hole for mounting a lamp in the reflector, said hole extending along an average direction which is approximately perpendicular to said optical axis, said hole being closable by means of a removable closure stopper, and releasable fastening means being provided between said stopper and said reflector requiring said stopper to move away from said optical axis along said average direction in order to move said stopper from a position in which it closes said hole to a position in which it is free therefrom; then, said average direction is situated substantially in said first plane and said hole is on the same side of said reflector as said lugs, said intermediate assembly part having a face facing said hole along said average direction and placed in the immediate proximity of said stopper when in its closure position and when said flange ends come into contact with said bottom grooves.

In this case the intermediate mounting part prevents any accidental or malicious removal of the stopper and the lamp, since such disassembly requires the reflector to be separated from the intermediate mounting part first.

It may be observed that this mounting part may be left in position on its support, thereby retaining the initial adjustment as determined relative thereto, so that after the reflector has been reassembled to said intermediate mounting part, the optical axis is again aligned along its initial direction without there being any need to readjust the intermediate part. Advantageously, the means for fixing the intermediate part to a support include means for adjusting its orientation as are well known to the person skilled in the art, thereby simplifying the initial adjustment of the orientation of the optical axis when the spotlight is first mounted on the support.

In a preferred embodiment of said mutual bearing areas, they comprise:

on each flange, a fixed area located on the downstream edge of said flange and facing downstream in said direction; and on said intermediate assembly part, the heads of two screws, with each flange being engaged by a corresponding one of said screw heads, placed upstream in said direction with respect to the said fixed area of the corresponding flange, said screws being screwable into said intermediate assembly part along respective axes included in said third plane, parallel to said fourth plane, and located between said groove bottoms. Such an embodiment makes it possible to adjust the positions of mutual thrust parallel to the optical axis, and consequently to press the end edges of the flanges against the bottoms of the grooves with sufficient pressure, when the spotlight is not in use, to ensure that flat contact between the end edges and the bottoms of the grooves is maintained even after maximum thermal expansion of the reflector (naturally within the normal operating temperatures applicable to such spotlights). The positions of the screw axes in said third plane, i.e. the fact that the mutual bearing areas themselves are located on average in said third plane and are therefore radial relative to said screw axes avoids any possibility of the screws tending to be unscrewed by variations due to cyclic changes in lug dimension and position due to thermal expansion. In other words there is no danger of the screws being worked loose by successive on/off cycles of the spotlight.

Flat contact between the edges of the flanges and the bottoms of the grooves is more easily maintained if the lugs include intermediate web portions which are flat, parallel to each other and to said first plane, and located between the first ends of said lugs and said flanges which are located at the second ends of said lugs; it is thus possible to call out an inherent degree of elasticity of the flanges for creating the wedging effect used to ensure that said contact is maintained.

Advantageously, the space defined between the ends of the flanges converges in the same direction as that in which a light beam is projected from the spotlight, thereby facilitating access to the screw heads (when said mutual bearing areas include two screw heads as mentioned above) and consequently facilitating assembly and disassembly of the reflector on its intermediate mounting part.

BRIEF DESCRIPTION OF THE DRAWINGS

An embodiment of the invention is described by way of example with reference to the accompanying drawings, in which.

MORE DETAILED DESCRIPTION

The following description is made with reference to the position in which the spotlight is conventionally mounted on a motor vehicle which is assumed to be standing on a horizontal plane. This gives a frame of reference in which the relative positions of the various parts of the spotlight are easily described, but it must be understood that references to various levels and directions cannot be taken as limiting in an absolute sense.

In conventional manner, the spotlight 1 shown in the drawings comprises a hollow reflector 2 having a lamp 3 located therein and having an open face 5 (which is the front face for a normal direction 4 of forward vehicle travel), which front face is surrounded by a peripheral flange 6 which receives an edge 7 of a glass 8 covering the open face 5 of the reflector 2 in order to close said reflector around the lamp 3. The edge 7 of the glass 8 and the peripheral flange 6 of the reflector 2 are fixed together by means of a glue which provides sealing therebetween while allowing for them to have different thermal expansions. The join between the glass and the reflector is hidden by a decorative strip 13 which may be snap-fastened thereon from the outside.

Inside, the reflector 2 has a reflecting face 9 suitably shaped to co-operate with the glass 8 in a manner known to the person skilled in the art to define an optical axis 10 whose direction, when the spotlight is in use, i.e. when the lamp 3 is fed with electricity, is defined by official regulations. The optical axis 10 is assumed to be approximately horizontal.

The inside face 9 of the reflector 2 constitutes one face of a wall 11 made of a material which is rigid and opaque, e.g. metal or plastic. The wall 11 has an outside face 12 with the faces 9 and 12 being substantially parallel to each other and defining a wall 11 of substantially constant thickness therebetween.

Figure 1:
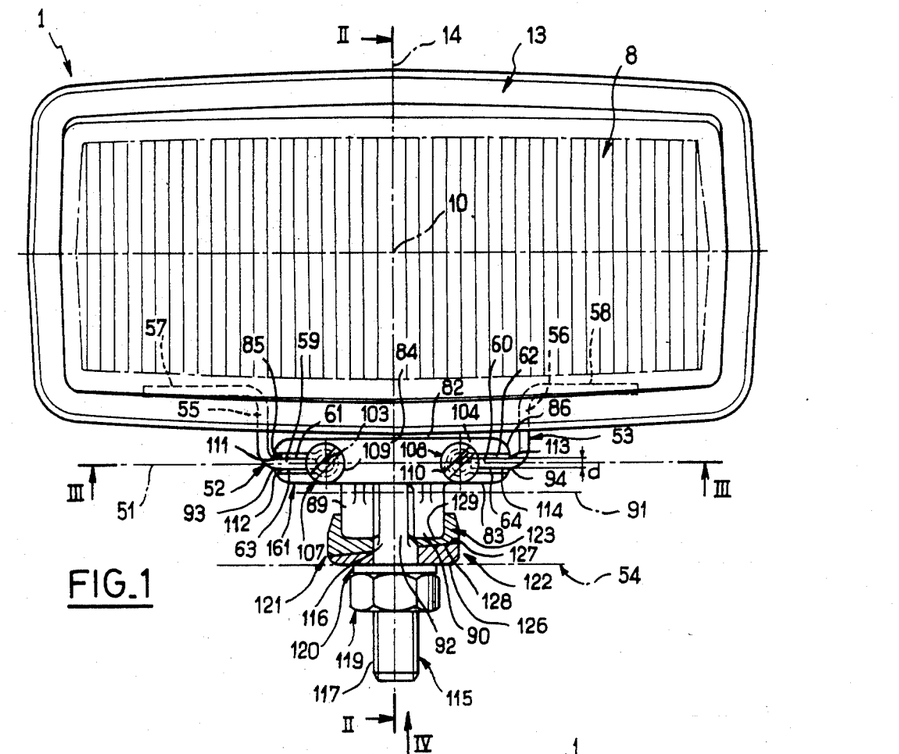
FIG. 1 is a front view of a spotlight for use with a motor vehicle and made in accordance with the present invention, the spotlight is shown as mounted on a support such as a bumper or a portion of the vehicle bodywork; naturally, the invention is not limited to spotlights for motor vehicles and it extends to any such light intended to project a beam whose shape and direction are determined when the light is in use.
Figure 2:
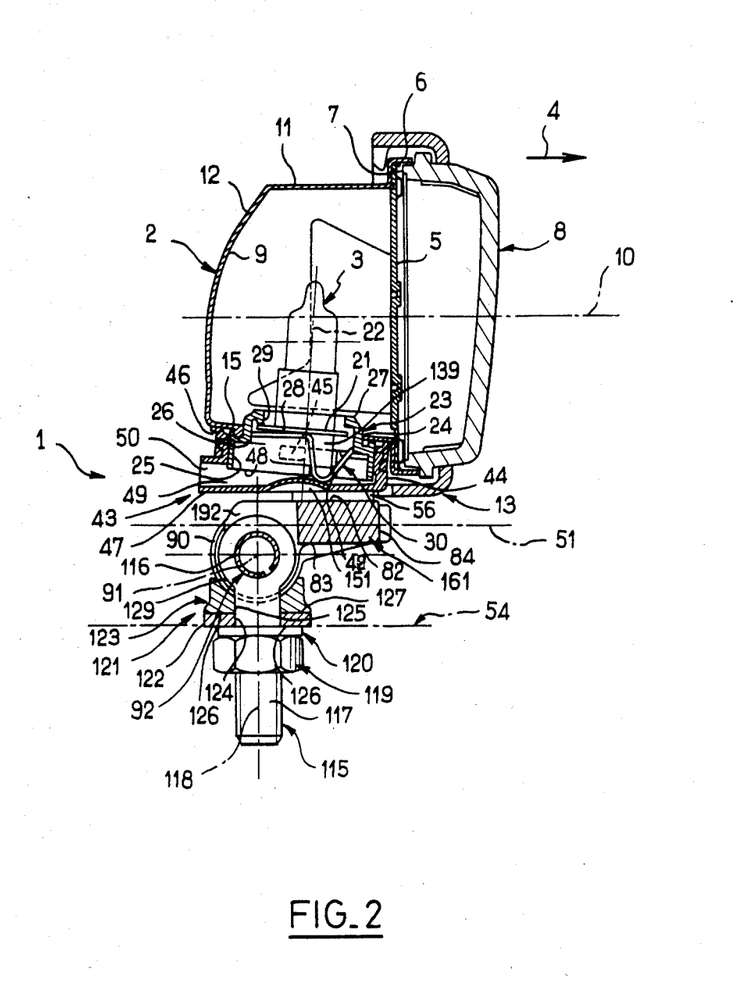
FIG. 2 is a section through said spotlight on a plane marked II—II in FIG. 1.

The assembly comprising the reflector 2 and the glass 8 has a vertical plane of symmetry 14 which includes the optical axis 10 and which is marked II—II in FIG. 1.

Towards the bottom of the wall 11 which constitutes the reflector 2, there is a flat bottom area 15 in which the inside and outside faces 9 and 12 are perpendicular to said plane of symmetry 14 and respectively directed upwardly and downwardly. This bottom area 15 of the wall 11 has a central area 16 which passes through the plane 14 and in which the parallel plane inside and outside faces 9 and 12 perpendicular to said plane of symmetry slope slightly downwardly in the forward direction (with reference to arrow 4) leaving two side areas 17 and 18 disposed symmetrically to each other about the plane 14 in which said inside and outside faces 9 and 12 while remaining parallel to each other and perpendicular to the plane 14 are oriented approximately horizontally. Each of the side areas 17 and 18 is connected to the central area by an intermediate area (with respective reference numerals 19 and 20) in which the mutually parallel inside and outside faces 9 and 12 are at an angle to the plane 14, with said intermediate areas 19 and 20 being symmetrically disposed to each other about the plane 14.

In the central area 16 of the bottom area 15 the wall 11 delimiting the reflector 2 has a hole 21 passing therethrough for mounting the lamp 3 inside the reflector, which hole 21 has an average direction 22 included in the plane of symmetry 14 and extending perpendicularly to the inside and outside faces 9 and 12 in the central area 16, i.e. approximately perpendicularly to the optical axis 10 given that the faces 9 and 12 are at a relatively small angle relative to the horizontal in said area 16.

The wall 11 delimits the hole 21 by a circularly cylindrical rim about an axis defined by said average direction 22, and has a lamp-holder socket 23 fixed thereto. The socket 23 is generally cylindrical about the axis 22 and includes a first portion 24 passing through the hole 21 and delimited by two cylindrical faces about the axis 22, and in particular by an outside face having exactly the same diameter as the rim delimiting the hole 21 in the wall 11 so as to be a close fit therein. The socket also has a second portion 25 situated outside the reflector and likewise delimited by two cylindrical faces about the axis 22, with these two faces being of greater diameter than the rim which delimits the hole 21 through the wall 11. A third portion 26 of the socket interconnects said first and second portions 24 and 25 and is in the form of an annular shoulder about the axis 22 and serves to bear against the outside face 12 of the reflector 2 around the hole 21. Finally, the socket has a fourth portion 27 situated inside the reflector 2 and being annularly disposed about the axis 22 inside said first portion 24, said fourth portion serving as a bearing surface towards the inside of the reflector for a standardized flange 28 on the lamp 3, so that pressing the flange 28 against the annular fourth portion 27 along the axis 22 towards the inside of the reflector 2 has the effect of placing the lamp 3 in its regulation position relative to the optical axis 10 of the reflector 2. In a manner known per se the annular fourth portion 27 of the socket 23 has three localized bearing bumps such as 29 facing outwardly from the reflector and the lamp is removably pressed against said bumps by means of a U-shaped spring 30 having two arms 33 and 34 disposed symmetrically to each other about the plane 14. These arms are interconnected by an intermediate strip 135 extending perpendicularly to the axis 14 and rotatably mounted on the third portion 26 of the socket 23 about an axis 31 which is likewise perpendicular to said axis 14. The arms have free ends which are releasably engaged in notches 32 in said third portion 26 of the socket 23 and located diametrically opposite to the axis 31 about the axis 22. This system is known per se as is the provision of regulation projections 35 and 34 inside the first portion 24 of the socket 23 for engaging in corresponding hollows in the flange 23 around the lamp 3 in order to prevent the lamp being wrongly mounted.

In similarly known manner, the socket 23 is made of electrically conductive material and includes a terminal 38 for electrical connection to a conductor 39 for feeding the lamp 3 with electricity. The terminal 38 is located in a region 37 of the second portion 25 of the socket, which region is set back towards the axis 22. The flange 28 of the lamp 3 provides an electrical connection between the socket 23 and the lamp per se. The electrical circuit is completed by the lamp having a base 139 which is located outside the reflector when the flange 28 bears against said fourth portion 27 of the socket 23, which base 139 is connected to a second conductor 40 for supplying the lamp with electricity.

Further, the second portion 25 of the socket 23 has two diammetrically opposite notches 41 and 42 on either side of the axis 22 serving to releasably hold a closure stopper 43 over the outside of said portion 25 by means of a so-called "bayonette" fastening.

To this end, the stopper 43 is advantageously a single piece (e.g. a single piece of molded plastic) having a sleeve-shaped wall 44 suitable for fitting over the second portion 25 of the socket 23. In other words the wall 44 on the stopper has an inside face which is cylindrical about the axis 22 and has an inside diameter which is substantially equal to the outside diameter of the second portion 25 of the socket 23. The inside face of said wall 44 has two inwardly directed pegs which co-operate with the notches 41 and 42 on the socket 23 in order to hold the stopper 43 on the socket 23 in the conventional bayonet-fitting manner. Only one of these pegs, 45, is visible in the drawings, which peg 45 co-operates with the notch 42 of the second portion 25 of the socket 23. Naturally, the other peg is located diametrically opposite to said peg 45 about the axis of the wall 44 so as to be able to co-operate with the other notch 41.

Advantageously, and as shown, the wall 44 on the stopper 43 has a flexible skirt 46 for providing a sealed but removable connection with the outside face 12 of the reflector wall 11 over the central area 16 of the flat bottom area 15 of said wall 11.

It may be observed, supposing the stopper 43 to be fixed to the socket 23 by its pegs 45 engaging in the notches 42 and 41 in the bayonet-fitting manner, removal of the stopper 43 from the socket 23 requires the stopper 43 to be rotated about the axis 22 relative to the socket 23 and then to be moved away therefrom along the axis 22 in order to completely disengage the pegs 45 from their corresponding notches 42 and 41.

The bottom of the wall 44 of the stopper 43 runs into a bottom wall 47 which is flat and at a slope relative to the axis of the wall 44, i.e. relative to the axis 22. Thus, when the stopper 43 is fixed to the socket 23 by its pegs such as 45 engaging in the notches 42 and 41, the bottom wall 47 is parallel to the optical axis 10 and is perpendicular to the plane 14. The far end of said second portion 25 of the socket 23 furthest from said third portion 26 is in the form of a plane annular face 48 which is syxmmetrical about the axis 22. When the stopper 43 is fixed to the socket 23, the front edge (in the direction of arrow 4) of said plane annular face 48 is in the immediate proximity of the bottom wall 47 of the stopper, whereas the rear edge (again relative to the arrow 4) of said annular face 48 leaves a gap 49 which is wide enough to pass the electrical conductors 39 and 40 which pass through the stopper 47 in this region via a passage 50 passing through the sleeve-shaped wall 44 where it runs into the bottom wall 47.

Apart from the limited passage 50 for the electrical conductors 39 and 40, the stopper 43 closes the bottom of the socket 23 when it is fixed thereto.

Any suitable means may be provided to facilitate rotating the stopper 43 about the axis 22 relative to the socket 23 when the stopper is being fitted thereto or removed therefrom. In the example shown, such means are constituted by a slot 151 located in the bottom wall 47 where it is intersected by the axis of the stopper 43 (which is the same as the axis 22), which slot is upwardly closed and downwardly open and is shaped to receive the edge of a coin for use as a screwdriver to turn the stopper.

Respective rigid lugs 52 and 53 are fixed to the outside face 12 of the wall 11, in the side areas 17 and 18 of the bottom area 15 thereof and project downwardly from the outside face 12. These lugs are for use in fixing the assembly constituted by the reflector 2 and the glass 8 to a support 54, e.g. a lug fixed to the bodywork of a vehicle or a vehicle bumper.

The two lugs 52 and 53 are advantageously made of the same substance as the reflector 2, and if the reflector is made as a plastic molding, they may be integrally molded therewith. Alternatively, they may be fixed to the reflector 2, e.g. by welding to the outside face 12 of the wall 11, as shown. Although the lugs 52 and 53 are nominally "rigid", it must be understood that they retain the elasticity inherent to the substance from which they are made, and to their shape, as described below.

In the example shown, the two lugs 52 and 53 are exactly symmetrical to each other about the plane 14 and they are mutually disjoint. They are Z-shaped having respective flat webs 55 and 56 extending parallel to the plane 14 and having substantially horizontal top and bottom flat flanges projecting therefrom (i.e. at 90° relative to said webs). In particular, the lugs 52 and 53 have respective top flanges 57 and 58 which are fixed flat against the outside face 12 of the reflector (e.g. by welding) in the side areas 17 and 18, and they have respective bottom horizontal flanges 59 and 60 for connection via an intermediate part 161 to the support 54.

The two bottom flanges 59 and 60 point towards each other and towards the plane 14. Since they are both flat they occupy the same mean plane 51 and are delimited relative to said plane by respective flat top faces 61 and 62 and by respective flat bottom faces 63 and 64. These top and bottom faces are all parallel to said plane 51 and they are coplanar in pairs, i.e. both top faces occupy the same plane above the plane 51 and both bottom faces occupy the same plane below the plane 51.

Perpendicularly to said plane 51, each of the flanges 59 and 60 is delimited firstly by its connection to the corresponding web 55 or 56, and secondly by respective edges 65 and 66 which are substantially perpendicular to the plane 51 and which interconnect the top and bottom faces of the flanges.

The shape of these edges 65 and 66 is described below with reference to their section on the plane 51 (i.e. the section plane III—III of FIG. 3). Since these edges extend perpendicularly to said plane, they would have the same shape on any parallel section plane taken anywhere between said top and bottom faces of said flanges and on said top and bottom faces.

Figure 3:
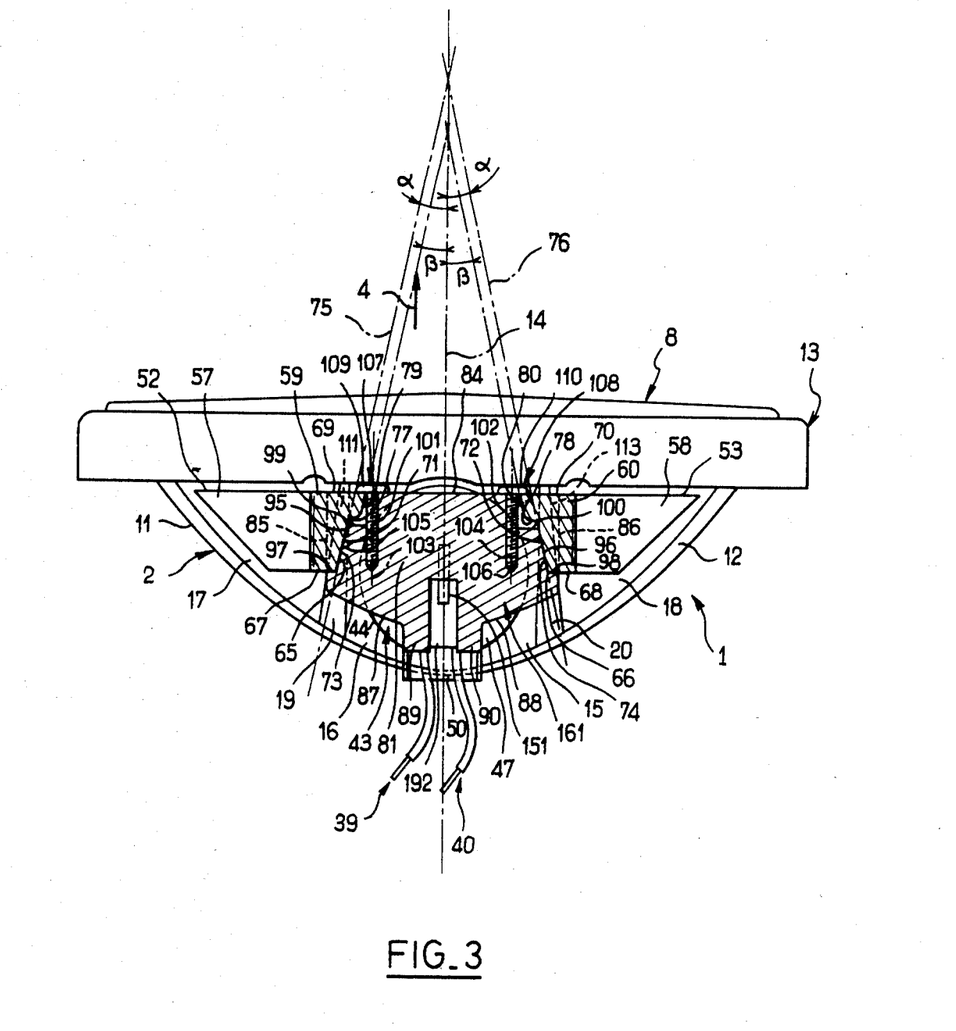
FIG. 3 is a section through said spotlight on a plane marked III—III in FIG. 1, said plane being perpendicular to the plane marked II—II.
Figure 4:
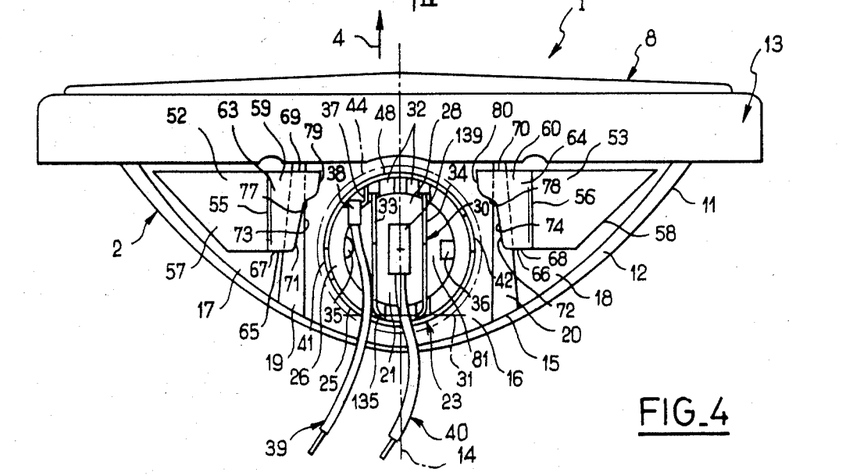
FIG. 4 is a view of the spotlight along an arrow marked IV in FIG. 1, which arrow lies in the plane marked II—II and is perpendicular to the plane marked III—III, with the spotlight being partially disassembled in this figure.

As can be seen in FIGS. 3 and 4, these edges 65 and 66 have respective rear portions 67 and 68 which are rectilinear and which extend perpendicularly to the plane 14. The term "rear" is taken with reference to the direction of beam projection 4. Similarly, they have respective rectilinear front portions 69 and 70 which are likewise perpendicular to the plane 14. The furthest ends of said four rectilinear edge portions 67, 68, 69, and 70 from said plane 14 are all at the same distance from said plane. However, the equal length front portions 69 and 70 are longer than the equal length rear portions 67 and 68 such that the front portions 69 and 70 terminate closer to said plane than do the rear portions 67 and 68. As a result the end portions 71 and 72 of said edges 65 and 66 interconnecting said rear and front portions converge mutually about said plane 14 in a forwards direction.

More precisely, going from either of the rear portions 67 or 68 in a forwards direction along said end portions 71 and 72, the edges 65 and 66 have respective major rectilinear first zones 73 and 74 which converge towards the plane 14 in a forwards direction, with each of said major first zones being at the same angle $\alpha$ relative to said plane. The angle $\alpha$ is such that theoretical rectilinear, i.e. plane erosions 75 and 76 respectively of said first zones 73 and 74 intersect the corresponding front portions 69 and 70 between the ends thereof. The forward ends of said first zones 73 and 74 run into second zones 77 and 78 which slope at a more pronounced forward angle towards said plane 14 and the forward ends of said second zones run into respective rectilinear third zones 79 and 80 which also converge in a forwards direction towards the plane 14 but at a less marked angle than said second zones Both of said third zones make the same angle $\beta$ relative to the plane 14, with the angle $\beta$ being substantially equal to the angle $\alpha$. The front ends of said third zones run into the inside ends of said front portions 69 and 70 thereby defining the closest points of the lugs 52 and 53 to the plane 14.

Thus, the first zones 73 and 74 of the end portions 71 and 72 of the edges 65 and 66 define a space 81 which converges in the forward direction parallel to the optical axis 10. This space 81, or more generally the space existing between the portion 71 of the edge 65 and the portion 72 of the edge 66 is large enough, given the size of the closure stopper 43, to enable the stopper to move freely along the axis 22, i.e. to allow the stopper to be put into place on the socket 23 or to be removed therefrom to give access to the lamp 3.

Although not shown, it will be readily understood by the person skilled in the art that the orthogonal projection of the bottom flanges 59 and 60 of the lugs 52 and 53 on a plane perpendicular to the axis 22 lie outside the orthogonal projection of the closure stopper 43 on such a plane.

The intermediate assembly part 161 is generally in the form of a rigid plate made, for example, by molding a thermally insulating material such as a plastic material. The material must be suitable for withstanding the temperatures to which the part 161 may be raised under normal conditions of use for the spotlight.

This plate is removably fixed to the bottom flanges 59 and 60 of the lugs 52 and 53 and has a mean plane which, when thus fixed to said flanges, coincides with said plane 51. The plate 161 has a top face 82 and a bottom face 83 which are plane, are located on either side of said plane coinciding with plane 51, and are parallel therewith. These plane top and bottom faces 82 and 83 curve round to edges which interconnect them and which extend perpendicularly to said top and bottom faces. In particular, the front edge of the intermediate assembly part 161 (when in its position of use) has a plane portion 84 which is perpendicular to said plane coinciding with plane 51 and which is also perpendicular to a plane which is perpendicular to said plane coinciding with plane 51 and coincides with the plane 14 when the part 161 is in its assembled position. The said plane coinciding with the plane 14 constitutes a plane of symmetry for the part 161. The maximum length of the front portion 84 of the assembly part 161 perpendicularly to said plane coinciding with plane 14 is less than the distance between the outmost ends of the rear portions 67 and 68 of the bottom flanges and more than the distance between the innermost ends of the rear portions 67 and 68 perpendicularly to plane 14.

The outer ends of the front portion 84 of the assembly part 161 run into respective side portions 85 and 86 on the same sides as the lugs 52 and 53 respectively. These side portions, when seen in a section on the plane 51 or a plane parallel thereto, are both rectilinear and of the same length, which length is greater than the distance between the front and rear portions of the bottom flanges 59 and 60 in a direction parallel to the optical axis 10. Going backwards along the side portions 85 and 86 of the assembly part 161, there are sloping portions 87 and 88 which of symmetry 14. The bare diameter is the same in each of the tabs and the bores are inteded to receive two portions of backward direction with reference to the direction of beam projection 4, which sloping portions are terminated by rearwardly extending tabs 89 and 90 disposed symmetrically to each other about the plane 14 and at a distance therefrom. The tabs 89 and 90 project downwardly below the bottom face 83 of the assembly part 161 and they have a bore running along a common horizontal axis 91 which extends perpendicularly to the plane a coaxial pin 92 whose use is described below. The pin 92 passes through both of the tabs 89 and 90 and also through a notch-shaped space 192 extending between the take and into the assembly part 161 along said plane coinciding with plane 14.

In the front and side portions 84 and 85, in zones thereof adjacent to their junction on one hand, and in the front and side portions 84 and 86, in zones thereof adjacent to their junction on the other hand, there are respective grooves 93 and 94 for receiving the flanges 59 and 60 of the lugs 52 and 53 respectively. To this end, the grooves lie in that mean plane of the part 161 which coincides with the plane 51, and the grooves are symmetrically shaped about that plane of the part 161 which coincides with plane 14.

These grooves are open in an outward direction away are approximatively rectilinear when seen in a section on the plane 51 or a plane parallel thereto and which converge toward the plane 14 in a from said plane coinciding with plane 14 to receive said flanges, and they are defined towards said plane by plane bottoms which are respectively referenced 95 and 96 and extends perpendicularly to said mean plane coinciding with plane 51 and at said angle α relative to the plane coinciding with plane 14 in such a manner that the relatively long first portions 73 and 74 of the end edges of the flanges lie flat against said bottoms 95 and 96 respectively, thereby firmly engaging the assembly part 161 between the relatively long edge portions 73 and 74.

The rear ends of the grooves 93 and 94 are terminated by the bottoms 95 and 96 moving out via link faces 97 and 98 to meet the side faces 85 and 86 of the assembly part 161. These link faces 97 and 98 are plane, face forwardly, and are perpendicular both to the planes of the part 161 which coincide with the planes 14 and 51 relatively. These faces 97 and 98 constitute engagement abutments for engaging the rear faces 67 and 68 of the bottom flanges 59 and 60 of the lugs 52 and 53. The person skilled in the art can readily determine the appropriate positions to be given to the link faces 97 and 98.

The front ends of the bottoms 95 and 96 of the grooves 93 and 94 are respectively connected to faces 99 and 100, which faces 99 and 100 face forwardly, are plane, are coplanar (as are the faces 97 and 98) and like the faces 97 and 98 they are oriented perpendicularly to both the planes of the part 161 which coincide with the planes 14 and 51 respectively. The groove bottoms 95 and 96 are of equal length between their corresponding end faces 97 and 99 or 98 and 100, in the plane coinciding with the plane 51 or in any parallel section plane, and this length is less than the length of the relatively long rectilinear portions 73 and 74 at the ends of the bottom flanges of the lugs, as measured between the rear face 67 and 68 and the corresponding second portions 77 and 78 in plane 51 or in any parallel section plane. As a result, when the rear edges 67 and 68 come into rearward abutment with the link faces 97 and 98 respectively, no contact is made between the second flange end portions 77 and 78 and the groove faces 99 and 100.

The groove faces 99 and 100 connect their respective groove bottoms 95 and 96 inwardly towards the plane coinciding with the plane 14 to reach respective blind holes 101 and 102 extending rearwardly into the assembly part 161 from its front edge 84. The holes 101 and 102 follow respective axes 103 and 104 which lie in the plane coincididng with the plane 51, which are parallel to each other and which are symmetrically disposed to each other about the plane coinciding with the plane 14. The distance between the axes 103 and 104 is less than the distance between the closest portions of the front edges 69 and 70 of the bottom flanges. The blind holes 101 and 102 are intended to receive respective screws 107 and 108, having threaded shanks 105 and 106 and having flat heads 109 and 111. The spacing between the axes 103 and 104 is less than the distance between the closest points of the bottom flanges by an amount which is greater than the maximum diameter of the screw shanks 105 and 106 and less than the diameter of the screw heads 109 and 111 which face the front edge 84 of the part 161. As a consequence, there is no mutual contact between the third zones 79 and 80 of the edges 65 and 66 and the screw shanks 105 and 106 when the screws are screwed into the holes 101 and 102 on one hand; on the other hand, the screw heads engage rearwards, with reference to the direction 4, the front edges 69, 70 of the flanges 59, 60 only between the innermost tips thereof, as defined by the respective junctions of the edge portions 69 and 70 with the zones 79, 80 of the edges 65 and 66, and the theoretical geometrical plane extensions 75, 76 of the relatively long first portions 73 and 74 respectively of the end edges of the flanges (the said extensions 75, 76 coinciding with similar theoretical plane extensions of the bottoms 95 and 96 of the grooves 93 and 94). In addition, the distance parallel to the direction 4 between the rear link faces 97 and 98 of the grooves in the assembly part 161 and the front face 84 thereof is less than the corresponding distance between the rear edges faces 67 and 68 and the front edge faces 69 and 70 of the bottom flanges of the lugs although the said distances are close to one another so that the screw heads can firmly urge the edge portions 73 and 74 against the groove bottoms 95 and 96 when the screws 107 and 108 are screwed into the holes 101 and 102.

Further, the grooves 93 and 94 are defined by top and bottom parallel plane faces which extend parallel to the said plane coinciding with plane 51 and which face said plane. The groove 93 has a top face 111 and a bottom face 112 while the groove 94 has a top face 113 coplanar with the top face 111 and a bottom face 114 coplanar with the bottom face 112. The distance between the top and bottom faces 111 and 113 or 112 and 114 perpendicular to the said plane coinciding with plane 51 is substantially identical to the distance d between the coplanar top faces 61 and 62 and the coplanar bottom faces 63 and 64 of the lug flanges, in a direction perpendicular to said mean plane 51. Thus, the faces 61 and 63 of the flange 59 lie flat against the faces 111 and 112 of the groove 93 while the faces 62 and 64 of the flange 60 lie flat against the faces 113 and 114 of the groove 94.

It may be observed that unscrewing the screws 107 and 108 releases the flanges 59 and 60 of the lugs 52 and 53 for sliding in a forwards direction (along arrow 4) out from the grooves 93 and 94, and consequently allows the assembly comprising the reflector 2 and its glass 8 to be separated from the assembly piece 161. In order to refix the flanges 59 and 60 of the lugs 52 and 53 in the assembly part 161, the flanges 59 and 60 are reinserted in the grooves 93 and 94 and then caused to slide backwardly (opposite direction to arrow 4) into the grooves. This sliding engagement is facilitated by the fact that there is initially a considerable degree of play specially between the sloping first portions 73 and 74 of the end faces of the flanges and the corresponding sloping bottom faces 95 and 96 of the grooves due to their sloping shape. Once the first portions 73 and 74 of the flange end faces have come into flat engagement with the bottoms 95 and 96 of the grooves, the screws 107 and 108 are screwed into the holes 101 and 102 along the axes 103 and 104 until a wedge effect occurs between the end faces of the flanges 59 and 60 and the bottoms 95 and 96 of the grooves, which wedging effect preferably causes elastic deformation of the lugs 52 and 53, in particular at their webs 55 and 56. The end result is that the assembly comprising the reflector 2 and the glass 8 is accurately positioned relative to the assembly part 161 in such a manner that the plane of symmetry 14 of said assembly coincides with the plane of symmetry of the assembly piece 161 and the mean plane 51 of the flanges coincides with the corresponding mean plane of the assembly part 161. Reasons of symmetry assure that this coincidence is maintained regardless of any thermal expansion which may take place in the reflector 2 and its fixing lugs 52 and 53 on the one hand and in the intermediate assembly part 161 on the other hand.

It may be observed that when the stopper 43 closes the socket 23 and when the intermediate assembly part 161 has the flanges 59 and 60 of the lugs 52 and 53 engaged in its grooves 93 and 94 so that the first end portions 73 and 74 of the flanges are engaged against the bottoms 95 and 96 of the grooves, the bottom wall 47 of the closure stopper 43 is located in the immediate proximity of the top face 82 of the assembly part 161. Thus, supposing the stopper 43 rotates relative to the socket 23 about the axis 22 sufficiently far for its pegs such as 45 to disengage the notches 42 and 41, the stopper 43 is prevented from moving along the axis 22 relative to the socket 23 away from the hole 21 in the reflector wall 11 with an amplitude sufficient for the sleeve-shaped wall 44 of the stopper to disengage from the second portion 25 of the socket 23. In other words, in such a case the top face 82 of the assembly part 161 constitutes an abutment preventing the closure stopper 43 from coming away from the socket 23.

The two tabs 89 and 90 of the intermediate assembly part 161 constitute an integral part of means for fixing the assembly part to the support 54 with the possibility of adjusting the orientation of those two planes of the part 161, i.e. the mean plane and the plane of symmetry thereof, which coincide respectively with the mean plane 51 and the plane of symmetry 14, with reference to the support 54 of the plane on which the vehicle stands. In other words the orientation of the optical axis 10 together with said planes 51 and 14 is adjustable with reference to the support 54 of the plane on which the vehicle stands.

To this end, the two tabs 89 and 90 make up a fork joint about their common axis 91 for engaging an eye bolt 115 whose eye 116 is slotted into the space 192 between the tabs 89 and 90 thereby preventing any displacement parallel to the axis 91. Further, the eye 116 engages the pin 92 since it has a cylindrical bore about the axis 91 with a diameter substantially equal to the diameter of the bores through the tabs 89 and 90, thereby ensuring that the only possible motion between the eye bolt 115 and the assembly part 161 is rotated about the axis 91.

The eye bolt 116 also has a threaded shank 117 whose axis 118 is perpendicular to the axis 91 and lies in the plane of symmetry 14. The threaded shank 117 projects downwardly from the tabs 89 and 90 and is engaged in a hole through the support 54 in order to engage a nut 119 which is screwed onto the eye bolt 116 from the opposite end to the eye with respect to the support 54 until it engages the support 54. A washer 120 is placed between the nut and the support.

In order to fix the assembly part 161 against rotation about the axis 91 relative to the bolt 115 once the nut 119 has been clamped against the support 54, friction means 121 are inserted between the support 54 and the tabs 89 and 90 in order to prevent said tabs 89 and 90, and consequently the assembly part 161 from rotating once said friction means are compressed between the tabs 89 and 90 and the support 54 by virtue of the nut 119 being tightened onto the shank 117.

The friction means are advantageously constituted by two superposed washers 122 and 123 having respective central bores 124 and 125 which are cylindrical about respective axes coinciding with the shaft axis 118 and which are of such a size as to be a relatively tight fit on the shaft 117. The washer 122 which is located between the other washer 123 and the support 154 has a plane annular face 126 which comes into contact with the support 54 and which extends perpendicularly to the respective axis coinciding with the shank axis 118. The opposite plane annular face 127 of the washer 122 is at an angle relative to the face 126 (see FIG. 1) and the washer 123 has a matching plane annular face 128 which comes into flat contact with the face 127, and which is at the same angle to the axis of the washer 123 coinciding with the shank axis 118 than the angle of the face 127 of the washer 122 with respect to the axis thereof, also coinciding with axis 118. The opposite face of the washer 123 is a hollowed out face 129 which is generally cylindrical about an axis coinciding with the axis 91 when the washers 122 and 123 are clamped between the support 54 and the tabs 89 and 90. The projecting ends of the tabs 89 and 90 are generally cylindrical about the axis 91 and complementary in shape to the face 129 of the upper washer 123 so that said face is a relatively close fit around a portion of said tabs 89 and 90 and serves to lock them in place by friction when the nut 119 is tightened, while still allowing relative rotation when the nut 119 is loosened. This makes it possible to adjust the orientation of the mid plane 51 and of the optical axis 10 relative to the horizontal (i.e. relative to the plane on which the vehicle is standing). Relative rotation between the washers 122 and 123 about the axis 118 serves, once their faces 127 and 128 are pressed against each other to shift the axis of the washer 122 relative to the axis 118, thereby shifting the face 126 so that it is no longer perpendicular to the axis 118, and consequently adjusting the orientation of the axis 118 relative to the vertical (or relative to a plane perpendicular to the plane on which the vehicle stands) because of the thrust between said face 126 and the support 54. This makes it possible to adjust the orientation of the plane of symmetry 14 relative to the vertical (or to said perpendicular plane), and in particular to place the axis 118 and the plane of symmetry 14 in a genuinely vertical (or perpendicular) plane even if the support 54 is at a small angle to the horizontal (or to the plane on which the vehicle stands). Further, by rotating the assembly constituted by the bolt 115, the friction means 121, the washer 120, and the nut 119 about the axis 118 and relative to the support 54 it is possible to adjust the direction in which the plane of symmetry 14 and consequently the optical axis 10 points in a horizontal plane (or a plane parallel to the plane on which the vehicle stands).

Naturally, the above-described embodiment of the invention is merely a non-limiting example and numerous variants thereof could be designed within the scope of the invention.

What is claimed:

1. A spotlight, in particular for a motor vehicle, said spotlight comprising a rigid reflector having a first optical axis together with means for mounting the reflector on a support, and in particular on a motor vehicle, wherein said means for mounting the spotlight comprise:

two rigid mounting lugs disposed on the outside of said reflector symmetrically to each other about a first plane including said first optical axis, each of said lugs having a first end which is directly fixed to said reflector and a second end which defines a second plane perpendicular to said first plane and parallel to said optical axis, said second ends of said lugs having end surfaces perpendicular said second plane and facing each other and cooperatively forming a wedge shape on opposite sides of and symmetrical with respect to said first plane, a rigid intermediate assembly part having wedge shaped surfaces perpendicular said plane and on opposite sides of and symmetrical about said first plane and cooperatively complementary to said wedge shaped end surfaces on said lugs, means for applying mutual thrust between the wedge shaped end surfaces of said lugs and said wedge shaped surfaces on said intermediate part whereby to maintain a fixed relationship of said reflector with respect to said first and second planes regardless of thermal expansion to which said reflector and said intermediate assembly part may be subjected within limits corresponding to normal heating condition when the spotlight is used at ambient temperature; and means for fixing said intermediate mounting part to said support.

2. A spotlight according to claim 1, wherein said means for fixing said intermediate assembly part to said support include means for adjusting the direction in which said spotlight points.

3. A spotlight according to claim 1, wherein said intermediate assembly part is made of a thermally insulating material.

4. A spotlight, in particular for a motor vehicle, said spotlight comprising a rigid reflector having an optical axis together with means for mounting the reflector on a support, and in particular on a motor vehicle, wherein said means for mounting the spotlight comprise:

two rigid mounting lugs disposed on the outside of said reflector symmetrically to each other about a first plane including said optical axis, each of said lugs having a first end which is directly fixed to said reflector and a second end in the form of a flat flange turned towards said first plane and disposed along a second plane perpendicular to said first plane and parallel to said optical axis, the flanges of said lugs being mutually disjoint and pointing plane end edges towards each other and said first plane, said plane end edges being perpendicular to said second plane and being at the same angle α relative to said first plane to define between said end edges a space which converges in a given direction parallel to said optical axis, each flange having first and second plane faces adjacent to said end edges, parallel to said second plane and respectively facing towards said reflector and away from said reflector, said first and second plane faces of each flange being separated from each other by a fixed distance d, and said first faces being coplanar with each other and said second faces being coplanar with each other;

a rigid intermediate assembly part having two grooves disposed along a third plane coinciding with said second plane and being symmetrically disposed to each other on either side of a fourth plane perpendicular to said third plane and coinciding with said first plane, said grooves being open in an outward direction away from said fourth plane and being delimited towards said fourth plane by respective plane bottoms extending perpendicularly to said third plane and at said angle α to said fourth plane, said grooves being further delimited going away from said third plane by respective first and second plane faces parallel to said third plane and facing said third face, said first and second plane faces of each groove being separated from each other by substantially said distance d, said groove first plane faces being coplanar and said second plane faces being coplanar, each flange being engaged in a respective groove in a position such that said first and second plane faces of each flange come into flat contact with said first and second plane faces of the corresponding groove and with said flange end edges coming into contact with said groove bottoms;

mutual bearing areas between said flanges and said intermediate assembly part, said bearing areas being situated respectively on said flanges perpendicularly to said first and second planes and along said second plane, between said first plane and theoretical plane extensions of said end edges, and on said intermediate part perpendicularly to said third and fourth planes and along said third plane, between said fourth plane and theoretical plane extensions of said groove bottoms, to urge said flanges upstream relative to said given direction and relative to said intermediate assembly part, thus applying said end edges of said flanges flat against said groove bottoms with a wedging effect, regardless of the thermal expansion to which said reflector and said intermediate assembly part may be subjected within limits corresponding to normal heating conditions when the spotlight is used at ambient temperature; and means for fixing said intermediate mounting part to said support.

5. A spotlight according to claim 4, including means for mutually disengaging said mutual bearing areas, thereby releasing said lug flanges from said grooves.

6. A spotlight according to claim 5, wherein said reflector includes a hole for mounting a lamp in the reflector, said hole extending along an average direction which is approximately perpendicular to said optical axis, said hole being closable by means of a removable closure stopper, and releasable fastening means being provided between said stopper and said reflector requiring said stopper to move away from said optical axis along said average direction in order to move said stopper from a position in which it closes said hole to a position in which it is free therefrom;

said average direction being situated substantially in said first plane and said hole being on the same side of said reflector as said lugs, said intermediate assembly part having a face facing said hole along said average direction and placed in the immediate proximity of said stopper when in its closure position and when said flange ends come into contact with said bottom grooves.

7. A spotlight according to claim 4, and including means for adjusting the positions of the mutual bearing areas in a direction parallel to said optical axis.

8. A spotlight according to claim 4, wherein said mutual bearing areas comprise:

on each flange a fixed area located on the downstream edge of said flange and facing downstream in said direction; and on said intermediate assembly part the heads of two screws, with each flange being engaged by a corresponding one of said screw heads, placed upstream in said direction with respect to the said fixed area of the corresponding flange, said screws being screwable into said intermediate assembly part along respective axes included in said third plane, parallel to said fourth plane, and located between said groove bottoms.

9. A spotlight according to claim 4, wherein said direction in which said space between said flange ends converges corresponds to the direction in which a light beam is projected along said optical axis by said spotlight.

10. A spotlight according to claim 4, wherein said lugs include respective intermediate web portions which are flat, parallel to each other and to said first plane, and located between the first ends of said lugs and said flanges which are located at the second ends of said lugs.

11. A spotlight according to claim 4, wherein said means for fixing said intermediate assembly part to a support include means for adjusting the direction in which said optical axis points.

12. A spotlight according to claim 4, wherein said intermediate assembly part is made of thermally insulating material.

13. A spotlight according to claim 4 wherein the reflector includes:
two rigid assembly lugs disposed outside said reflector and disposed symmetrically to each other about a first plane, which first plane includes said optical axis, each of said lugs having a first end which is directly fixed to said reflector and a second end in the form of a flat flange turned towards said first plane and disposed along a second plane perpendicular to said first plane and parallel to said optical axis, the flanges of said lugs being mutually disjoint and pointing plane end edges towards each other and said first plane, said plane end edges being perpendicular to said second plane and being at the same angle α relative to said first plane to define between said end edges a space which converges in said given direction parallel to said optical axis, each flange having first and second plane faces adjacent to said end edge, parallel to said second plane and respectively facing towards said reflector and away from said reflector, said first and second plane faces of each flange being separated from each other by a fixed distance d, and said first faces being coplanar with each other and said second faces being coplanar with each other.

14. A spotlight according to claim 13 wherein the reflector includes a hole for mounting a lamp in the reflector, said hole extending along an average direction which is approximately perpendicular to said optical axis, said hole being closable by means of a removable closure stopper, and releasable fastening means being provided between said stopper and said reflector requiring said stopper to move away from said optical axis along said average direction in order to move said stopper from a position in which it closes said hole to a position in which it is free therefrom;
said average direction being situated substantially in said first plane and said hole being on the same side of said reflector as said lugs.

15. A spotlight according to claim 13 wherein said direction in which said space between said flange ends converges corresponds to the direction in which a light beam is projected along said optical axis by said reflector.

16. A spotlight according to claim 13, wherein said lugs include respective intermediate web portions which are flat, parallel to each other and to said first plane, and located between the first ends of said lugs and said flanges which are located at the second ends of said lugs.

17. A spotlight according to claim 4 wherein said intermediate assembly part is rigid and has two grooves lying in a third plane and disposed symmetrically to each other about a fourth plane which is perpendicular to said third plane, said grooves being open going away from said fourth plane and being delimited, towards said fourth plane by respective plane bottoms extending perpendicularly to said third plane being at a same angle α relative to said fourth plane, said grooves being further delimited going away from said third plane by respective first and second plane faces parallel to said third plane and facing said third plane, said first and second plane faces of each groove being separated from each other by a fixed distance d, said groove first plane faces being coplanar, said groove second plane faces being coplanar, and said intermediate assembly piece including means for fixing it to a support.

18. A spotlight according to claim 17 wherein said means for fixing said intermediate assembly part to a support include means for adjusting the orientation of said intermediate assembly part relative to said support.

19. A spotlight according to claim 17 wherein said intermediate assembly part is made of thermally insulating material.

* * * * *